(12) United States Patent
Chen (10) Patent No.: US 9,045,190 B2
(45) Date of Patent: Jun. 2, 2015

(54) TWO-WHEELED SELF-BALANCING MOTORIZED PERSONAL VEHICLE WITH TILTING WHEELS

(76) Inventor: Shane Chen, Camas, WA (US)

( * ) Notice: Subject to any disclaimer, the term of this patent is extended or adjusted under 35 U.S.C. 154(b) by 258 days.

(21) Appl. No.: 13/312,307

(22) Filed: Dec. 6, 2011

(65) Prior Publication Data

US 2013/0032423 A1 Feb. 7, 2013

Related U.S. Application Data

(63) Continuation-in-part of application No. 13/196,675, filed on Aug. 2, 2011, now Pat. No. 8,584,782.

(51) Int. Cl.
*B62D 61/00* (2006.01)
*B62K 3/00* (2006.01)
*A63C 17/00* (2006.01)
*A63C 17/01* (2006.01)
*A63C 17/08* (2006.01)

(52) U.S. Cl.
CPC ............. *B62K 3/007* (2013.01); *A63C 17/0073* (2013.01); *A63C 17/014* (2013.01); *A63C 17/08* (2013.01); *A63C 2203/10* (2013.01)

(58) Field of Classification Search
USPC ............................ 180/218, 6.48, 6.5
See application file for complete search history.

(56) References Cited

U.S. PATENT DOCUMENTS

| | | | |
|---|---|---|---|
| 7,717,200 B2* | 5/2010 | Kakinuma et al. | 180/6.5 |
| 8,162,328 B2* | 4/2012 | Horiguchi et al. | 280/5.509 |
| 2007/0251735 A1* | 11/2007 | Kakinuma et al. | 180/6.5 |
| 2008/0147281 A1* | 6/2008 | Ishii et al. | 701/49 |
| 2009/0032323 A1* | 2/2009 | Kakinuma et al. | 180/218 |
| 2010/0025139 A1* | 2/2010 | Kosaka et al. | 180/218 |
| 2010/0071984 A1* | 3/2010 | Doi et al. | 180/218 |
| 2010/0121538 A1* | 5/2010 | Ishii et al. | 701/48 |

* cited by examiner

*Primary Examiner* — Kevin Hurley (57) ABSTRACT

A vehicle with two independently rotatable wheels arranged opposite from each other and bridged by a linking structure, having a driving motor for each wheel, and having electronic fore-and-aft self-balancing capabilities. The two wheels are capable of tilting side-to-side in unison to execute turns. The vehicle can carry a rider, who may stand on foot supports either between or outside of the wheels and operate the vehicle by leaning forward, backward, or sideways to direct travel in the direction of leaning. Further means are provided for producing advantages in stability and portability.

14 Claims, 7 Drawing Sheets

TWO-WHEELED SELF-BALANCING MOTORIZED PERSONAL VEHICLE WITH TILTING WHEELS

CROSS-REFERENCE TO RELATED APPLICATIONS

This is a continuation-in-part of application Ser. No. 13/196,675, filed 2011 Aug. 2 now U.S. Pat. No. 8,584,782.

FIELD OF THE INVENTION

The present invention relates to vehicles having two wheels arranged opposite from each other and having means for supporting a standing human rider; and in particular, to those wherein the two wheels do not share a common axle. It also relates to motorized vehicles having fore-and-aft self-balancing capabilities.

BACKGROUND OF THE INVENTION

The most well-known example of a self-balancing motorized vehicle with two wheels arranged opposite from each other, wherein a person can ride the vehicle by standing on a foot support(s) between the wheels, is disclosed as the main embodiment of U.S. Pat. No. 6,302,230 by Sramek et al. (That embodiment is commercially known as the "Segway".) The vehicle of the '230 patent has a handlebar means which serves to assist the standing rider's stability, and to carry an interface for steering the vehicle. This vehicle is an effective short- or medium-distance transportation method; however, some users needs would be better met by a vehicle having similar configuration of wheels and similar fore-and-aft balance means, but without a handlebar. In particular, such a vehicle would provide greater portability and greater convenience in mounting and dismounting, as well as the opportunity to have both hands free, all of which are advantageous in many circumstances.

However, if a rider of a vehicle with this type of wheel configuration has no points of contact with any part of the vehicle other than the surface(s) which support his feet—this includes the absence of a handlebar—then he may have difficulty keeping his ankles and knees stable. Although the vehicle itself is capable of remaining balanced in the fore-and-aft plane, the riding stance may be too unsupported and "loose" for the average person to maintain comfortably, as he must regulate the positions of his feet and legs in relation to the vehicle in addition to directing the vehicle's travel. Such a vehicle thus requires new means for supporting rider stability. It also requires new means by which the rider can control the vehicle's steering. Additionally, new and better means for improving portability, stability, and/or intuitiveness of control are demands which always exist in this and related fields.

SUMMARY OF THE INVENTION

The present invention is a vehicle with two independently rotatable wheels arranged opposite from each other, having a driving motor for each wheel and also having self-balancing capabilities in the fore-and-aft plane. The vehicle is capable of supporting a human rider, who controls the movement of the vehicle by shifting her weight in the fore-and-aft plane and by leaning to the left and to the right. The frames are connecting by a linking structure configured such that the wheels are capable of tilting side-to-side in unison during turns. This may be achieved by means of a plurality of parallel linking members each pivotably coupled to both frames, wherein at least two of the linking members are disposed at different heights relative to the riding surface. The tilting capability of the wheels provides improved stability and comfort during turns.

The vehicle may be capable of converting to a folded position in which the wheels are closer together for carrying or stowage, by means such as hinges in the linking members. The vehicle in folded position may be carried by means of a handle coupled to the linking structure, and the handle may extend clear of the wheels and the frames when the vehicle is fully folded.

The vehicle is configured such that the rider may stand on foot support surfaces between the two wheels with one leg in firm contact with the inward-facing side of each frame, or alternatively with one leg against the outward-facing side of each frame. This increases the amount and distribution of points of contact between the rider's body and the vehicle, which dramatically improves the stability and ease of use of the vehicle in the absence of a handlebar. To aid the rider in using frictional contact with the frames to stabilize her legs, special leg contact surfaces may be provided on the frames. These leg contact surfaces may be made from a material which provides greater friction than that of the frames; they be also slightly curved to fit the general shape of the rider's legs.

DETAILED DESCRIPTION

Figure 1:
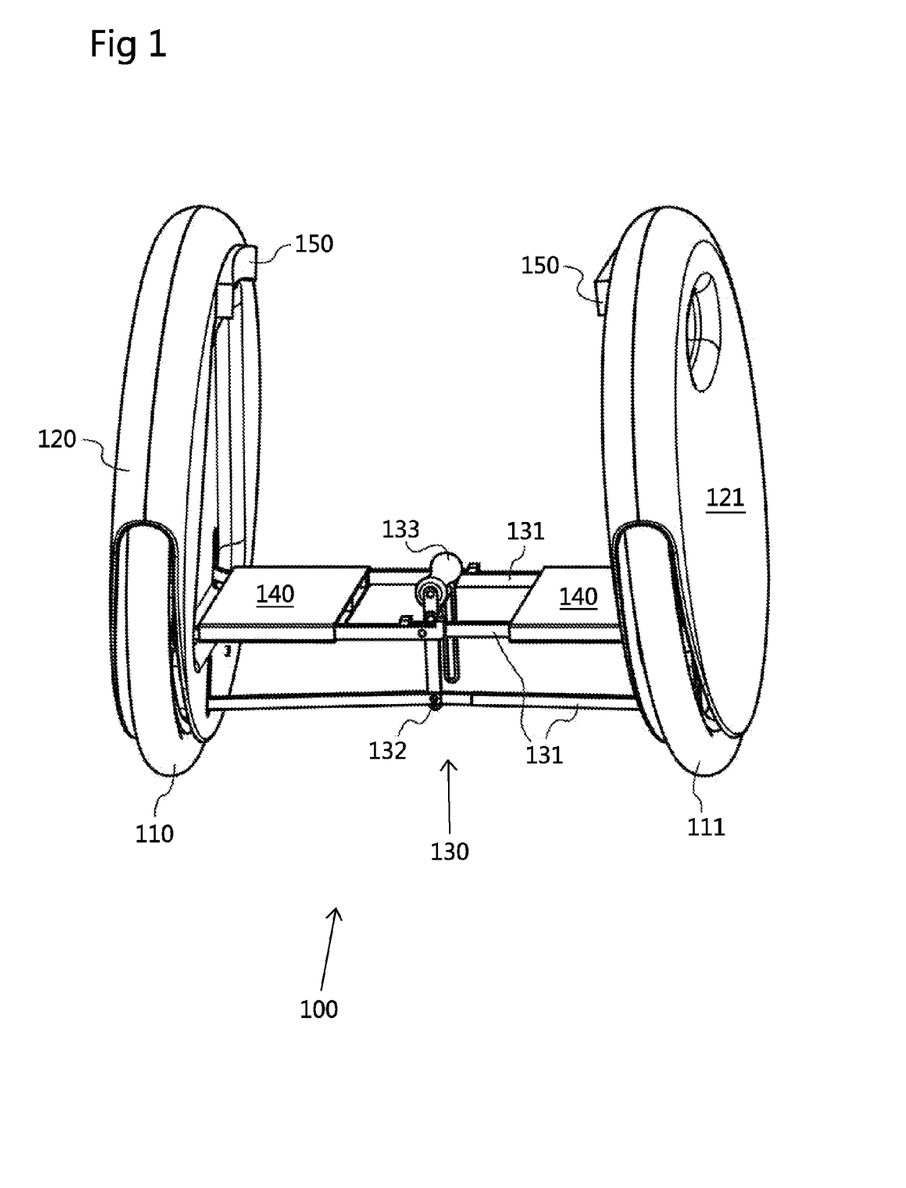
FIG. 1 shows a perspective view of one embodiment of a personal vehicle in accordance with the present invention.

Referring to FIG. 1, a perspective view of a personal vehicle in accordance with the present invention is shown. Vehicle 100 comprises two wheels 110 and 111, each respectively connected to a frame 120 and 121; a linking structure 130 coupled at one end to frame 120 and at the other end to frame 121, for connecting the two frames; two foot support surfaces 140 positioned between wheels 110 and 111 for a person to stand on; and a handle for carrying vehicle 110, coupled to linking structure 130. Wheels 110 and 111 are arranged opposite from each other, but do not share a common axle, and are therefore independently rotatable and capable of spinning at different speeds and/or in opposite directions. The wheels may be of a wide range of sizes, but those shown in FIG. 1 are relatively large, having a diameter comparable to the length of an adult person's lower leg. Each of wheels 110 and 111 is respectively coupled to some kind of frame structure 120 and 121, which can be implemented in various possible forms as long as they connect wheels 110 and 111 to linking structure 130. In this embodiment, frames 120 and 121 are formed as shells or housings in which wheels 110 and 111 are encased and partially enclosed. In addition to their primary function of connecting wheels 110 and 111 to linking structure 130, frame structures 120 and 121 may also serve other purposes such as supporting and guiding wheels 110 and 111, protecting wheels 110 and 111 from rain, dirt, etc., or shielding wheels 110 and 111 from coming into contact with the rider's body or clothes.

Linking structure 130 is disposed generally horizontally, and is coupled at one end to frame 120 and at the other end to frame 121. It comprises three linking members 131—two on the same horizontal plane, and a third positioned below the first two. (Other numbers and configurations of linking members 131 are possible, provided that at least two of them are at different heights relative to the riding surface.) Linking members 131 are parallel to each other, and each is pivotably coupled to both of frames 120 and 121 such that wheels 110 and 111 can tilt from side to side relative to linking structure 130 without significantly disrupting the horizontal disposition of linking structure 130. The arrangement of at least two of linking members 131 at different heights serves to link wheels 110 and 111 to each other such that any tilting of the wheels must occur simultaneously, in the same direction, and to generally similar degrees. (If the wheels are parallel to each other their respective magnitudes of change in angle will always be substantially equal. If the wheels are cambered, their respective magnitudes of change in angle may not be substantially equal but will be generally similar.) These features of linking structure 130 are important to achieving the capability of wheels 110 and 111 to tilt or lean in the direction of a turn, which provides greater stability during turns and reduces the chances of tipping.

Figure 2:
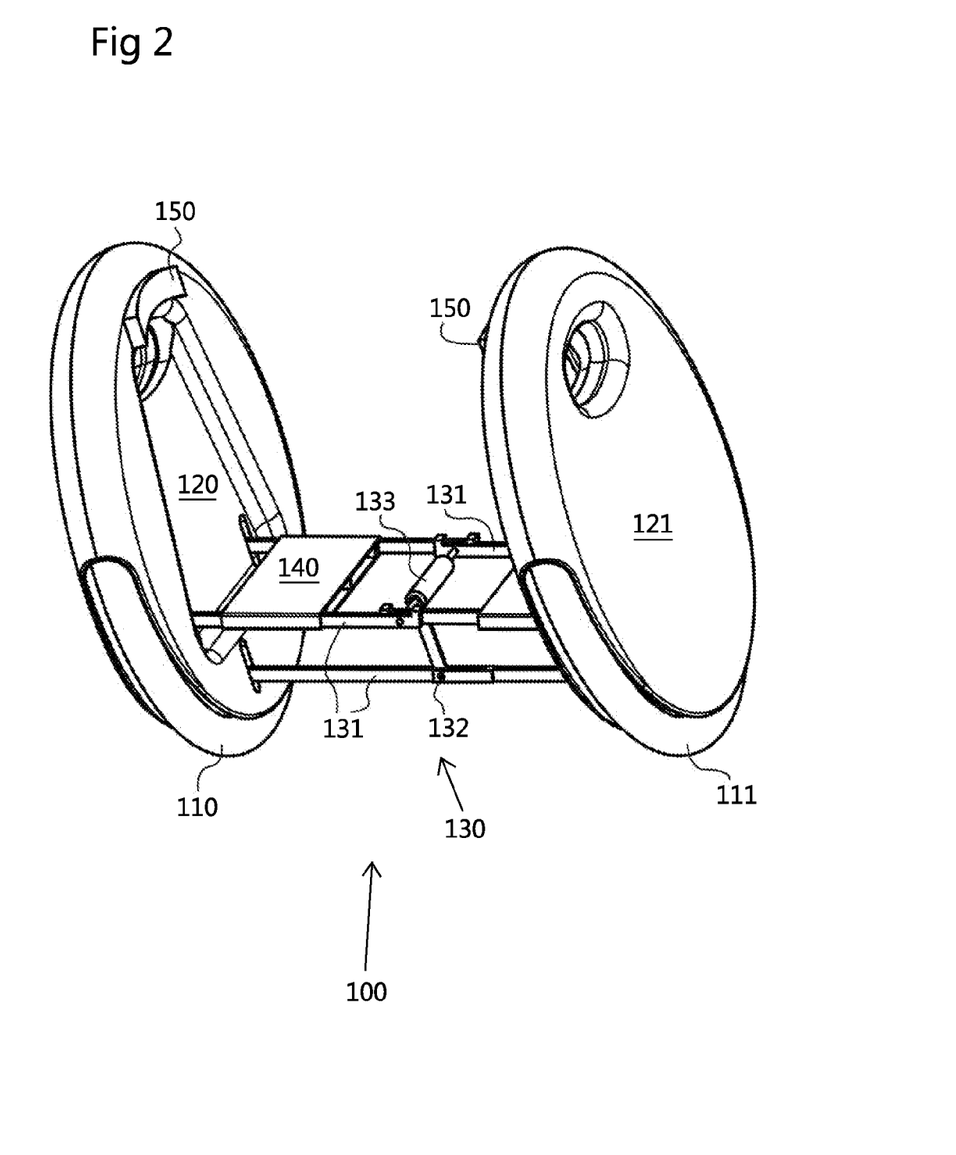
FIG. 2 shows a perspective view of the vehicle of FIG. 1 with wheels tilted to one side, as during a turn.

FIG. 2 shows vehicle 100 during a left turn. In order to initiate a left turn, the rider leans sideways to the left, which pushes wheels 110 and 111 to tilt in unison to the left (This tilting action activates a tilt-detecting means in the electronic control system, described in further detail below.) The tilting of each wheel occurs on an axis generally aligned with the direction of travel (i.e., the change in angle each wheel incurs during tilting is generally in a vertical plane oriented perpendicular to the direction of travel). Linking members 131, being pivotably coupled to both of frames 120 and 121, are not substantially angularly displaced away from horizontal; but those of linking members 131 which are positioned at different heights shift horizontally relative to each other. (It is shown in FIG. 2 that the two upper linking members have shifted left relative to the lower linking member.) This allows linking structure 130 to remain generally horizontal while wheels 110 and 111 lean into the turn. Foot supports 140, being rigidly coupled to the two top linking members 131, likewise remain generally horizontal. These features increase safety and comfort for the rider. Additionally, the shifting action of linking members 131 result in slight shifts in horizontal and vertical position of foot supports 140, which may make it smoother and more comfortable for the rider to shift his weight sideways.

Note that the foot support surfaces shown in these figures are specific embodiments of a general load-bearing surface or surfaces which may support a person, and which may also be used to carry various objects even without a human rider. These load-bearing surfaces can be of various shapes and sizes and may be coupled to the linking structure or to the frame(s).

Figure 3:
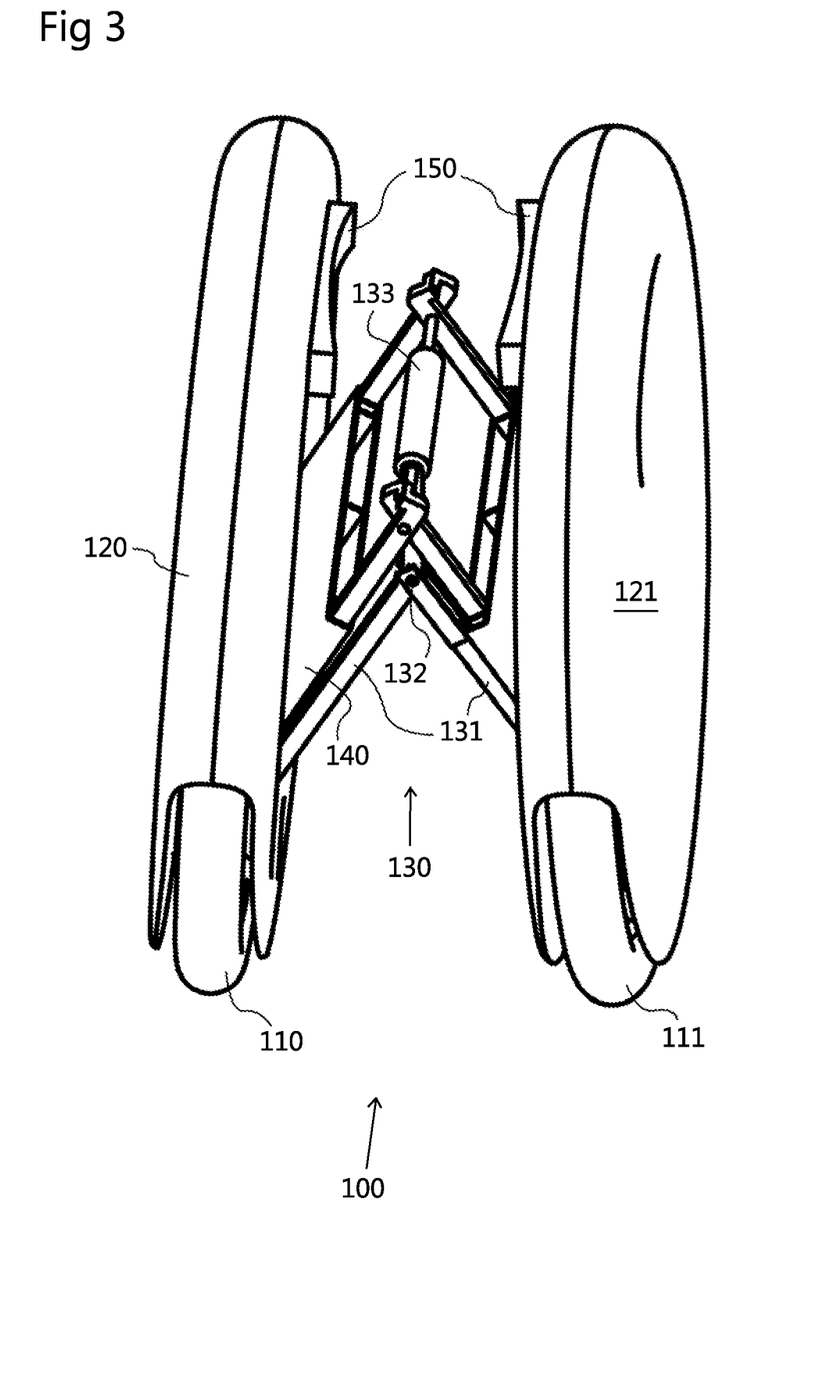
FIG. 3 shows a top perspective view of the vehicle of FIG. 1 with its linking structure partially folded.

FIG. 3 shows vehicle 300 in a partially folded state. For convenience of carrying and stowage, means is provided for vehicle 300 to convert into a collapsed position in which wheels 110 and 111 are closer together than they are when the vehicle is in use. In this example, this function is achieved by folding of linking structure 130. In particular, each of the three linking members 131 has a hinge 132. In this embodiment each of hinges 132 is located in the middle of its respective linking member, but in general hinges 132 need only be arranged such that their combined folding constitutes folding of the entire linking structure 130.

A handle 133 may be coupled to one or more of linking members 131. In the embodiments shown, handle 133 is positioned in the middle of linking structure 130, in substantially the same vertical plane as hinges 132. When handle 133 is pulled upward, the force transmitted to hinges 132 (in conjunction with the weight of wheels 110 and 111) causes linking structure 130 to fold, as shown in FIG. 3, bringing wheels 110 and 111 closer together. Handle 133 can then be used to carry the folded unit by hand.

Figure 4:
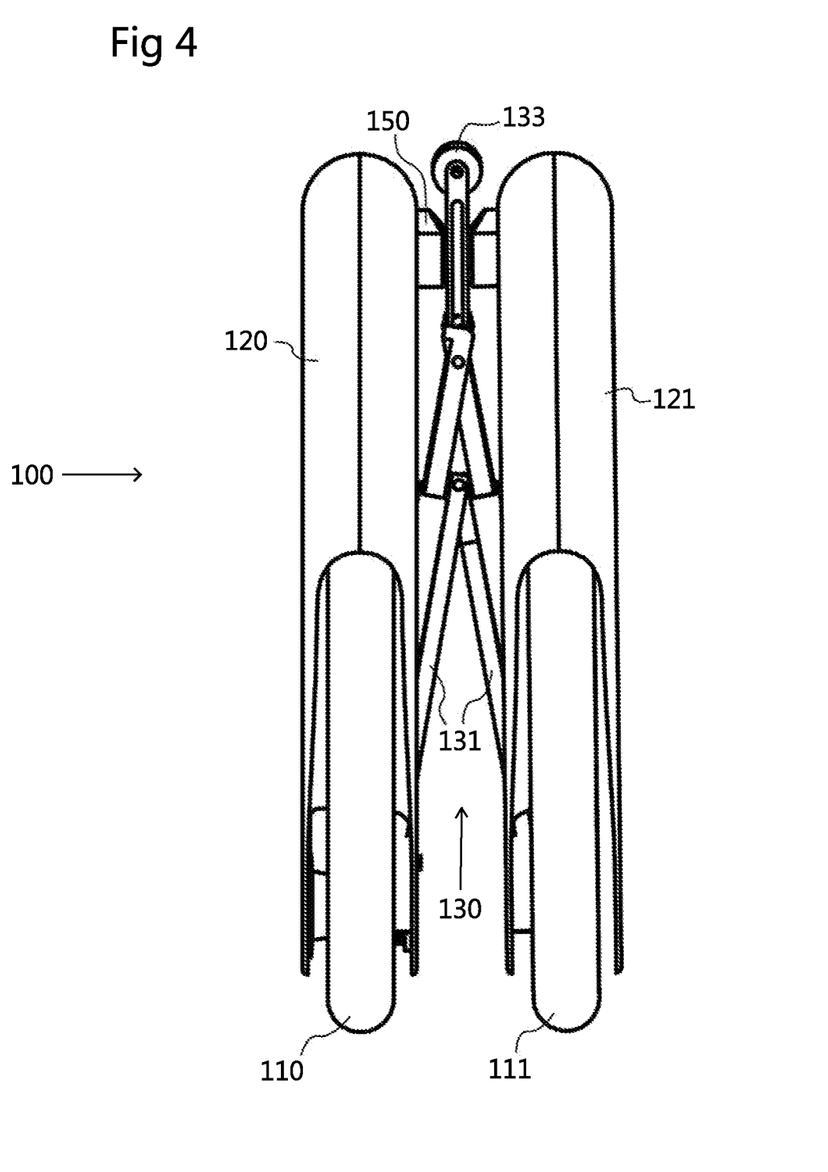
FIG. 4 shows a side view of the vehicle of FIG. 1 with its linking structure fully folded and handle extended.

Handle 133 may furthermore be extendable, as in FIG. 4 wherein linking structure 130 is completely folded. This feature of handle 133 is embodied here as a sliding element 151 coupled to handle 133 rigidly, and coupled to linking members 131 so as to be vertically movable through a certain range. Sliding element 151 therefore allows handle 133 to move vertically relative to its point(s) of attachment to linking structure 130. When handle 133 is pulled upward it first slides to its fully extended position; further upward force causes linking structure 130 to fold as described above. Handle 133 and sliding element 151 is configured such that when linking structure 130 is fully folded, handle 133 extends beyond the topmost edges of wheels 110 and 111 and/or frames 120 and 121, thereby allowing a person to carry vehicle 100 with her hand clear of the wheels and the frames. This provides for greater comfort for the person carrying the vehicle, and also allows the wheels to be very close together in folded position.

Note that there exist other possible means, other than the specific sliding mechanism described here, by which the handle may be made to extend beyond the wheels and the frames.

In order to achieve optimum stability, the rider preferably stands with his lower legs firmly in contact with frames 120 and 121. This creates multiple points of contact between the rider and the vehicle so that the rider can easily hold his feet and lower legs in position. To aid in this, vehicle 100 further comprises two leg contact surfaces 150, one coupled to each of frames 120 and 121. Leg contact surfaces 150 are affixed to the inward-facing sides of frames 120 and 121, and positioned such that they can come into contact with the lower legs of a rider standing with one foot on each of foot support surfaces 140. Leg contact surfaces 150 may be made from a soft, yielding, and/or textured material, in order to provide friction which aids the rider in stabilizing his legs against frames 120 and 121. They may furthermore be slightly curved concavely around a substantially vertical axis to fit the general shape of the rider's legs.

Figure 5:
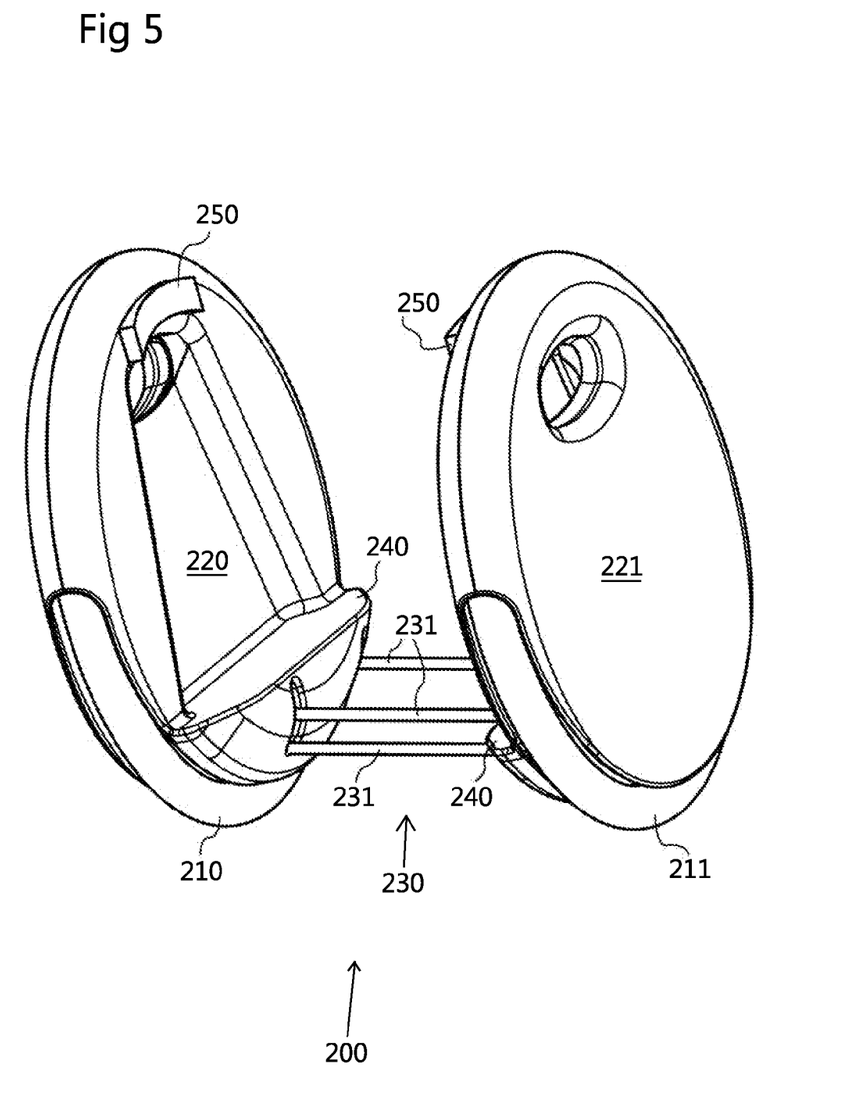
FIG. 5 shows a perspective view of a different embodiment of a personal vehicle in accordance with the present invention, with wheels tilted to one side as during a turn.

FIG. 5 shows a perspective view of a different embodiment of the vehicle of the present invention, with a configuration of foot support surfaces alternative to those of the previous embodiments. Vehicle 200 comprises wheels 210 and 211, frames 220 and 221, linking structure 230 with linking members 231, and leg contact surfaces 250, which perform essentially the same functions as their counterparts in vehicle 100. (This embodiment does not include means for folding linking structure 230, or a handle.) However, vehicle 200 further comprises two foot support surfaces 240, one of which is rigidly coupled to the inward-facing side of each of frames 220 and 221. These foot support surfaces 240 may be individual pieces which are rigidly coupled to frames 220 and 221, or they may simply be each molded from the same piece of material as their respective frames 220 and 221.

Figure 6:
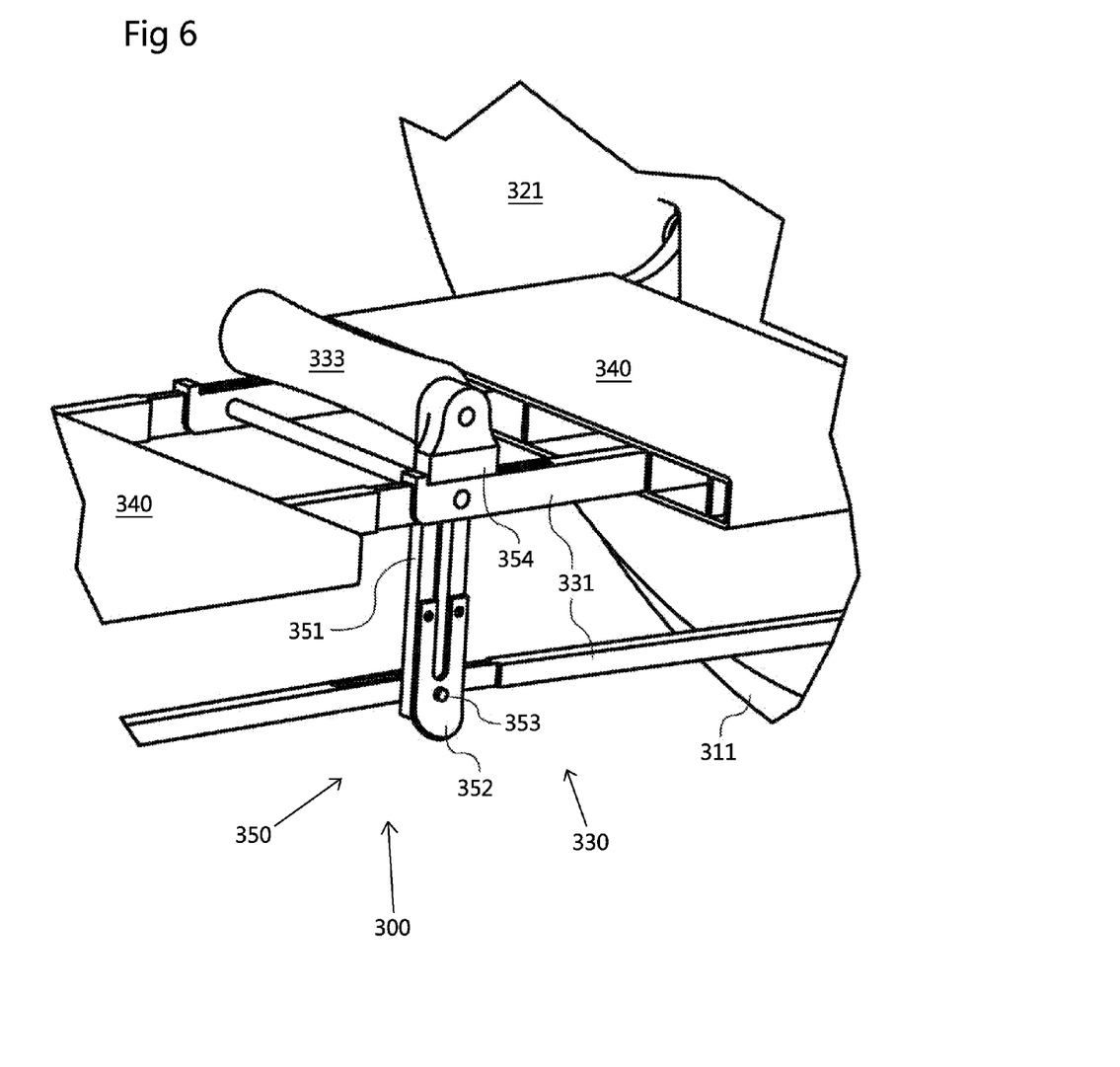
FIG. 6 shows a detail of a perspective view of another embodiment of a personal vehicle, having a bias means and locking mechanism in accordance with the present invention.

FIG. 6 shows a detail of a perspective view of a vehicle 300. In addition to the same features of vehicle 100, vehicle 300 further comprises a bias piece 354, and a locking mechanism 350 associated with handle 333. Handle 333 is rigidly coupled to sliding element 351, which is capable of sliding substantially vertically relative to linking structure 330; thus handle 333 is extendable in the same manner as previously described for vehicle 100. Bias piece 354 is made of an elastic material such as rubber, and is firmly attached to either handle 333 or linking structure 330 such that it can be pinned between some part of handle 333 and some part of one of linking members 331. In the embodiment shown, bias piece 354 is formed as a rectangular block firmly attached beneath one end of handle 333. Vehicle 330 can be converted from a folded position (see FIGS. 3 and 4) into an unfolded position by pushing downward on handle 333 while vehicle 300 is set generally upright on a surface. Starting from its fully extended position, handle 333 first slides downward along sliding element 351, and then further downward force causes linking structure 330 to unfold until linking members 331 are substantially straight and bias piece 354 is in contact with both handle 333 and one of linking members 331. Locking mechanism 350 engages to hold the structure in this position.

The locking mechanism 350 of this embodiment has a locking piece 352 rigidly coupled to sliding element 351. Locking piece 352 engages with locking pin 353 on the lower linking member, and prevents linking structure 330 from folding when not desired (due to the elasticity of bias piece 354 or any other cause). When the wheels lean during a turn, linking members 331 shift horizontally relative to each other as previously described. Handle 333 remains in the same position relative to the upper two linking members, and locking piece 352 remains engaged with locking pin 353 on the lower linking member. The resultant tension created in sliding element 351 deforms and/or compresses bias piece 354, which due to its elasticity tends to return to its original shape, thereby biasing the entire structure to a neutral, non-turning position (i.e., a position in which the wheels are not substantially tilted to the left or to the right and are substantially mirror images of each other).

Figure 7:
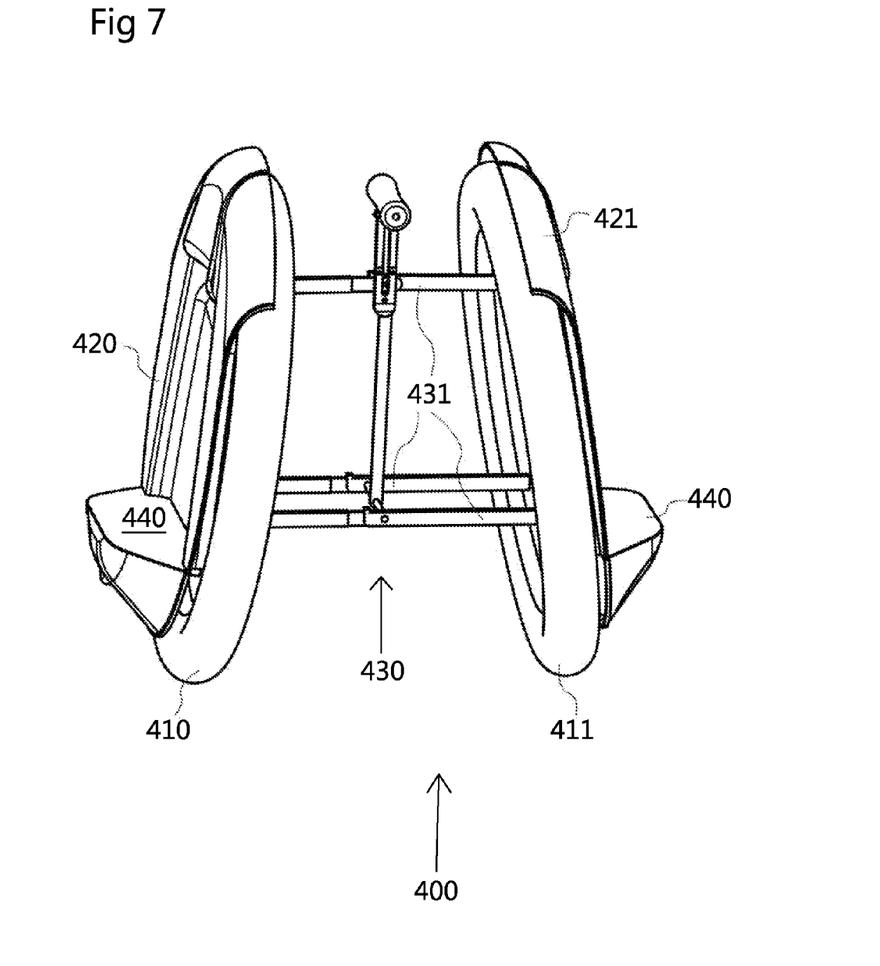
FIG. 7 shows a perspective view of another embodiment of a personal vehicle in accordance with the present invention.

FIG. 7 shows a perspective view of a vehicle 400 in accordance with the present invention. Vehicle 400 has features similar to those of the previous embodiments, including a foldable linking structure 430. However, the foot supports 440 are on the outward-facing sides of their respective wheel frames 420 and 421, instead of being between the two wheels 410 and 411 as in the other embodiments. The rider stands with her lower legs against the sides of frames 420 and 421, and accordingly the leg contact surfaces are also on the outward-facing sides of wheel frames 420 and 421. Wheels 410 and 411 may be cambered, and the camber angle may generally fit the angle of the rider's legs. One benefit resulting from this outside-standing arrangement is that linking structure 430 between the two wheels may occupy more vertical space that in the inside-standing arrangements. Having greater difference in height between the lower and the upper linking member(s) 431 provides an advantage in stability—linking structure 430 has more leverage to synchronize the tilting of wheels 410 and 411.

Each wheel is driven by a respective motor. In the embodiments shown, the motors are housed within their respective frames and are not exposed. The motors are directed by an electronic control means which enacts automatic fore-and-aft balancing of the vehicle. (A single electronic control means may control both motors, or each wheel may have its own independent electronic control means which control their respective motors.) The electronic control means is capable of sensing forward or backward tilting of the vehicle—by gyrosensors, accelerometer, or other means known in the art—and responds by directing the motors to accelerate or decelerate appropriately in order to maintain equilibrium in a fore-and-aft balanced position. (The balanced position is considered to be one in which the axis on which the side-to-side tilting of each wheel occurs is approximately horizontal.) The same mechanism enables the rider, standing on foot support surfaces, to direct the vehicle's forward and backward travel through shifting of her center of gravity. She can shift her weight forward or backward to cause the vehicle to accelerate in that direction, and can shift her weight in the direction opposite that in which the vehicle is moving to cause the vehicle to decelerate.

As described above, the rider initiates a turn by leaning sideways toward the desired direction of the turn, whereupon the wheels tilt sideways, remaining in contact with the rider's legs, and the linking members shift horizontally relative to each other. The electronic control means may comprise a means for detecting one or more of these changes. For example, the electronic control means may sense the sideways tilting of one or more of the wheels (via gyroscope, accelerometer, etc.). It then adjusts the respective speeds and/or directions of one or both of the wheels, thereby creating a difference in velocity which causes the vehicle to turn toward the direction in which the rider has shifted her weight. The combination of these steering controls and the fore-and-aft controls create a simple and intuitive means for a rider to operate the vehicle.

The motors may drive the wheels through a type of drive mechanism known in the art and sometimes called a "friction drive". For instance, each of the two motors may drive a spinning cylindrical component which may have a small radius compared to that of the wheel, and which is in contact with the inner rim of the wheel. Friction between the surface of the spinning component and the inner rim of the wheel provides the grip necessary for the motor to transmit torque to the wheel. The friction drive mechanisms may be used in conjunction with hubless wheels, which are substantially lighter-weight than wheels having center hubs and which therefore enhance the portability of the vehicle.

The invention claimed is:

1. A personal vehicle comprising:
 a first wheel and a second wheel, independently rotatable, positioned opposite from each other, and separated by a distance;
 a first motor for driving said first wheel and a second motor for driving said second wheel;
 a first frame attached to said first wheel and a second frame attached to said second wheel;
 a linking structure coupled to both said first frame and said second frame;
 at least one electronic control means for controlling said first and second motors; and
 at least one leg contact surface on each of said first and second frames for contacting said person's legs, said leg contact surfaces being fabricated of a yielding material;
 wherein each of said first and second wheels are capable of tilting side-to-side in unison about a respective wheel tilting axis, relative to the riding surface; and
 wherein said at least one electronic control means enacts fore-and-aft balancing of said vehicle.

2. The vehicle of claim 1, wherein said linking structure comprises at least two independent elongated linking members, each coupled to both of said first and second frames, wherein said two linking members are positioned at different heights.

3. The vehicle of claim 1, wherein said vehicle is capable of converting between an unfolded position and a folded position, in which said distance between said first and second wheels is lesser in said folded position than in said unfolded position; and further comprising a handle coupled to said linking structure by means of which said vehicle may be carried when said vehicle is in said folded position.

4. The vehicle of claim 3, wherein said handle is capable of extending beyond the uppermost edges of said first and second frames when said vehicle is in said folded position.

5. The vehicle of claim 1, wherein said first and second wheels have a negative camber angle.

6. The vehicle of claim 5, wherein said vehicle is capable of converting between an unfolded position and a folded position, said distance between said first and second wheels being lesser in said folded position than in said unfolded position; and wherein said first and second wheels are substantially parallel to each other when said vehicle is in said folded position.

7. The vehicle of claim 1, further comprising a wheel tilt bias means for biasing said first and second wheels to a position in which the are substantially mirror images of each other.

8. The vehicle of claim 1, wherein each of said first and second motors transmits torque respectively to said first and second wheels through frictional contact between some part of said motor and some part of said wheel.

9. The vehicle of claim 1, further comprising at least one load-bearing surface between said first and second wheels for supporting a person, or an object or objects.

10. The vehicle of claim 9, wherein said at least one load-bearing surface is coupled to said linking structure.

11. The vehicle of claim 9, wherein said at least one load-bearing surface is rigidly connected to at least one of said first and second frames.

12. The vehicle of claim 1, further comprising a foot support surface on the outward-facing side of each of said two frames for supporting a standing rider.

13. A personal vehicle comprising:
a first wheel and a second wheel, independently rotatable, positioned opposite from each other, and separated by a distance;
a first motor for driving said first wheel and a second motor for driving said second wheel;
a first frame attached to said first wheel and a second frame attached to said second wheel;
a linking structure coupled to both said first frame and said second frame;
at least one electronic control means for controlling said first and second motors; and
a foot support surface on the outward-facing side of each of said two frames for supporting a standing rider;
wherein each of said first and second wheels are capable of tilting side-to-side in unison about a respective wheel tilting axis, relative to the riding surface; and
wherein said at least one electronic control means enacts fore-and-aft balancing of said vehicle.

14. A personal vehicle comprising:
a first wheel and a second wheel, independently rotatable, positioned opposite from each other, and separated by a distance;
a first motor for driving said first wheel and a second motor for driving said second wheel;
a first frame attached to said first wheel and a second frame attached to said second wheel;
a linking structure coupled to both said first frame and said second frame;
at least one electronic control means for controlling said first and second motors; and
a first foot support surface coupled to the first wheel and facing outwardly from the first frame and a second foot support surface coupled to the second wheel and facing outwardly from the second frame for supporting a standing rider;
wherein each of said first and second wheels are capable of tilting side-to-side in unison about a respective wheel tilting axis, relative to the riding surface; and
wherein said at least one electronic control means enacts fore-and-aft balancing of said vehicle.

* * * * *